United States Patent [19]
Fallon et al.

[11] Patent Number: 5,914,483
[45] Date of Patent: *Jun. 22, 1999

[54] SUN SENSOR

[75] Inventors: James J. Fallon, Bronxville, N.Y.; Gerald Falbel, Stamford, Conn.

[73] Assignee: Ithaco Space Systems, Inc., Ithaca, N.Y.

[ * ] Notice: This patent is subject to a terminal disclaimer.

[21] Appl. No.: 08/932,650

[22] Filed: Sep. 18, 1997

Related U.S. Application Data

[62] Division of application No. 08/410,924, Mar. 27, 1995, Pat. No. 5,698,842.

[51] Int. Cl.⁶ .................................................. G01J 1/20
[52] U.S. Cl. ..................................... 250/203.4; 244/3.16
[58] Field of Search ............................. 250/203.4, 203.6, 250/203.1; 244/3.16, 3.21, 3.18, 164, 171; 356/141.1–141.3

[56] References Cited

U.S. PATENT DOCUMENTS

| | | | |
|---|---|---|---|
| 3,744,913 | 7/1973 | Farthing et al. | 250/203.1 |
| 4,018,532 | 4/1977 | Fletcher et al. | 250/203.4 |
| 4,404,465 | 9/1983 | Miller | 250/203.4 |
| 4,445,030 | 4/1984 | Carton | 250/203.4 |
| 4,999,483 | 3/1991 | Okamoto | 250/203.1 |
| 5,698,842 | 12/1997 | Fallon et al. | 250/203.4 |

*Primary Examiner*—Que T. Le
*Attorney, Agent, or Firm*—Harris Beach & Wilcox LLP.

[57] ABSTRACT

A sun sensor for use in orbiting satellites provides accurate attitude control yet eliminates the use of complicated optical components. The improved accuracy results from adjustment of the relative positions of a slit or pinhole aperture and a cooperating linear array of photodetector elements to increase the operating range of the sun sensor. Enhanced accuracy is further achieved by the use of a relatively wide slit instead of complicated optical components, in conjunction with a processing procedure which uses the finite angular subtense of the sun to increase the accuracy of the attitude control of the satellite by the sun sensor. A further embodiment of the invention includes a sun sensor device having dual "pinhole" apertures which is particularly useful for attitude control of a spinning satellite.

4 Claims, 4 Drawing Sheets

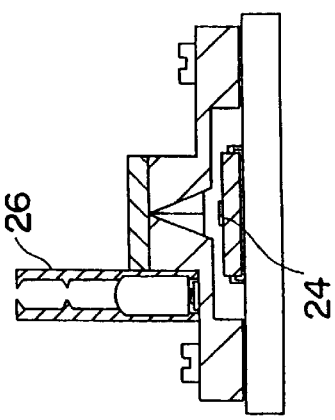
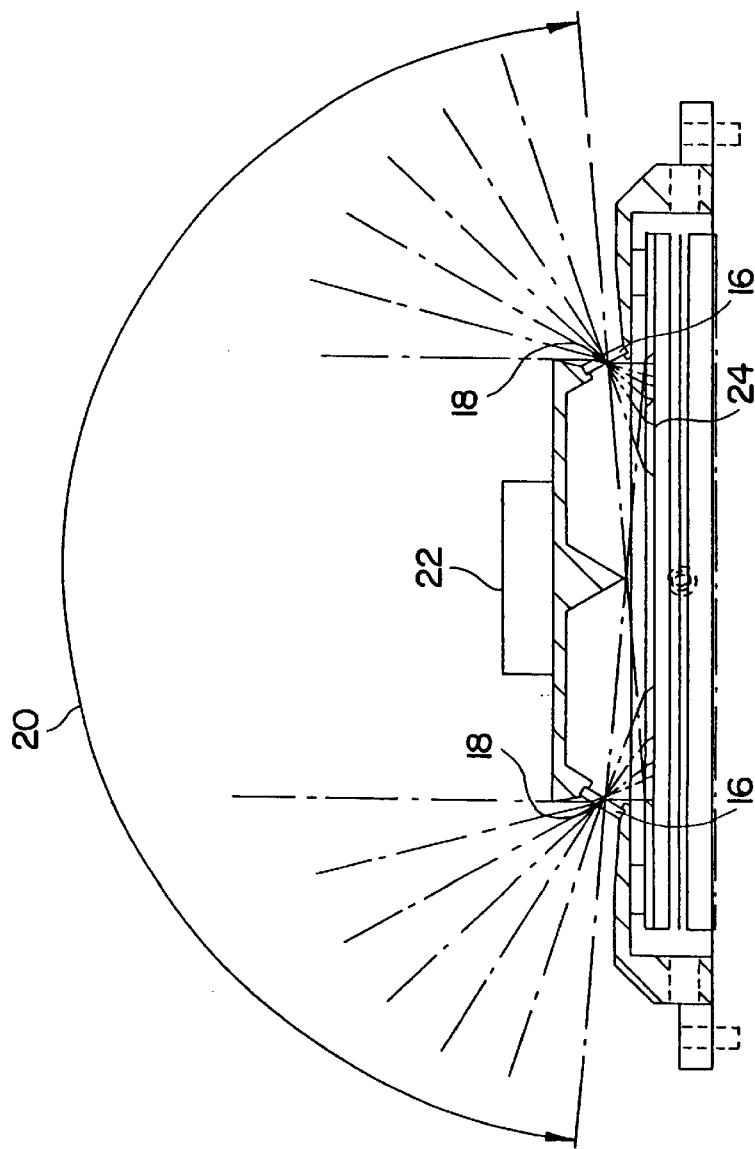

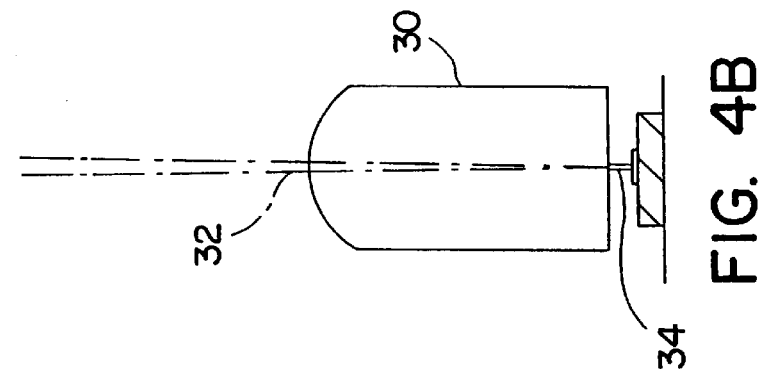
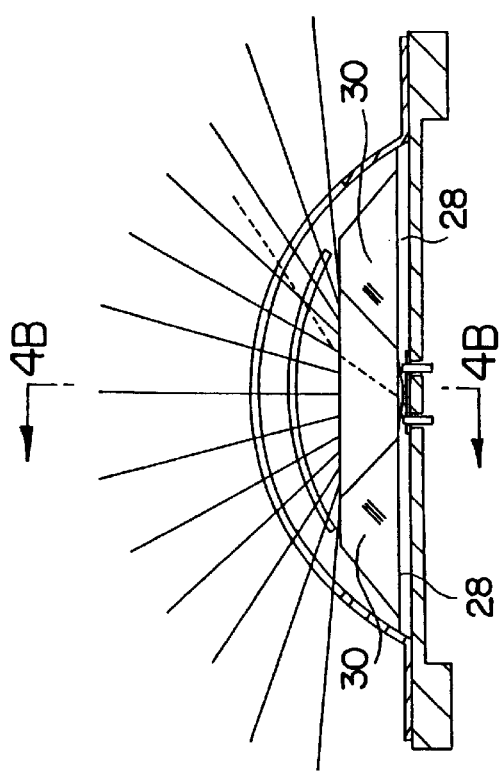
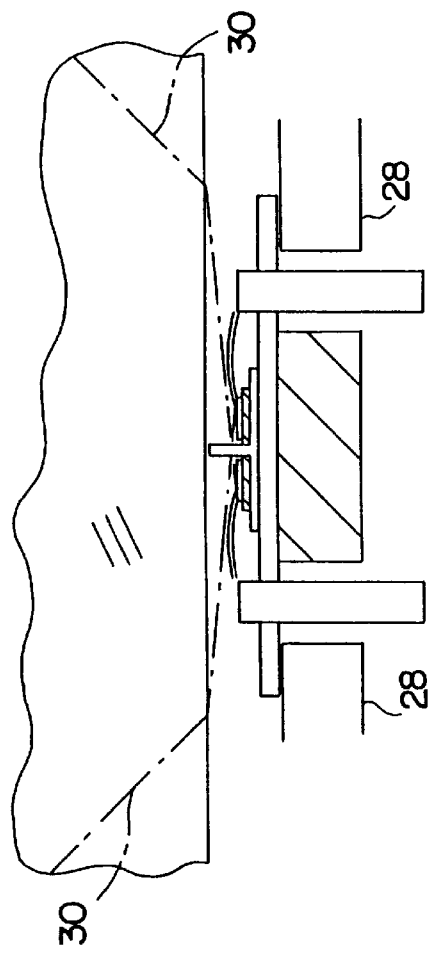

SUN SENSOR

This application is a division of application Ser. No. 08/410,924 filed Mar. 27, 1995 which application is now: U.S. Pat. No. 5,698,842.

BACKGROUND OF THE INVENTION

Sun sensors are devices used on spacecraft for attitude control thereof. Known sun sensors for attitude control of three axis stabilized and/or spinning spacecraft employ both analog and digital signal processing. Conventional implementation of sun sensors employing analog signal processing include the provision of a slit or pinhole aperture which directs the sun's irradiance on to a quadrature array of silicon photodetectors. By using a radiant balance technique in which the signals from opposite silicon cells are subtracted to result in a difference signal which is related to the off-axis position of the sun, conventional analog sun sensors employ a relatively small number of electronic components, resulting in a relatively low failure rate. However, a sensor output signal indicating the off-axis position of the sun is proportional to the absolute responsivity of the silicon cells, as well as the uniformity of the silicon cell response across its surface. As a result, off-axis accuracy decreases based upon the achievable responsivity stability versus time and environment for large sensor angular fields of view, which are desirable in sun sensor devices. Accordingly, the off-axis accuracy of sun sensors using conventional analog signal processing means exhibit decreased accuracy at relatively wider angular ranges.

Sun sensor devices employing conventional digital signal processing employ silicon detector arrays arranged in an angular code, in which the angular subtense of an element in the array subtends more than the projection of the entrance slit by the sun rays onto the sun sensor array. These known devices provide uniform off-axis accuracy versus time and environment, but the absolute accuracy of such devices is limited to one half of the minimum angular resolution of the Least Significant Bit in the digital silicon detector array.

Conventional sun angle sensor devices including both analog and digital sensor systems are marketed by Adcole Aerospace Products, of Marlborough, Mass. Reference is made to the following publications of Adcole Aerospace Products for further information disclosing known sun sensor devices: "Sun Angle Sensor Systems—Short Form Catalog"; "Spin Mode, V-Slit Sun Sensor Assembly Adco Model 20470"; "Model 18960—Sun Angle Sensor System"; "Model 17470—Analog Sun Sensor"; "Stationkeeping/Yaw Control Sun Sensor Assembly For Geosynchronous Satellites Adco Model 20480"; "Model 16765 Sun Angle Sensor System"; "Model 16764 Sun Angle Sensor System"; "Model 17061 Sun Angle Sensor System"; "Model 18980 Sun Angle Sensor System"; "Model 20910 Sun Angle Sensor System"; and "Model 20020 Sun Angle Sensor System".

It is the primary object of the invention disclosed herein to provide an improved digital sun sensor including the long term accuracy of the conventional digital array sun sensor implementation, but eliminating the absolute accuracy limitation imposed by the relationship between the digital array angular resolution and the angular width of the entrance slit of the sensor. In accordance with this objective, increased accuracy over a wider angular range or field of view is provided in a simplified and economical manner, without employing complicated optical components, as a result of adjustment to the relative positions and dimensions of existing components. The improved arrangement and adjustments are provided in conjunction with improved processing means which increase the overall accuracy of the sun sensor device without the provision of complicated optical components.

Other improvements and advantages of the sun sensor device in accordance with the present invention will become apparent to those skilled in the art from the following discussion.

SUMMARY OF THE INVENTION

The present invention provides a sun sensor device for accurate attitude control of spacecraft without employing complicated and expensive optical components. The sun sensor device in accordance with the present invention provides an increased angular field of view or angular range greater than that achievable by known sun sensor devices, and in which accuracy limitations inherent in such known devices are overcome by adjustments and variations in the arrangement and operative relationship between components comprising the sun sensor device.

In accordance with a first improvement to sun sensors provided by the present invention, the distance between a slit or pinhole aperture provided for directing the sun's irradiance on an array of photodetectors, and the position of the array of photodetectors, is decreased as compared to the relative position of these elements in the known sun sensor devices. By positioning the slit closer to the array of photodetectors, the angular range or field of view of the sun sensor is increased compared to that of conventional sun sensors without diminishing the accuracy thereof. The accuracy of the improved sun sensor in accordance with the present invention is further enhanced if the slit or pinhole aperture is defined in a window which is thicker than that used in conventional sun sensors. The use of a thicker window provides shielding for the electronic components in the sun sensor, which is advantageous in high ionizing radiation environments that exist in certain space orbits (the Van Allen radiation belts).

In a further aspect of the present invention, the slit defined in the window is wider than the Least Significant Bit (LSB), but the sun sensor device compensates for the increased slit width by improved signal processing which provides a "ramp" type signal resulting from the finite angular subtense of the sun which is thereafter smoothed to increase the overall accuracy of the signal processing without the use of complicated optics or optical components. The improved processing of the signal employs a wider slit for directing the sun's irradiance on the array of photodetectors such that the subtense of the sun subtends several Least Significant Bit optical elements. The signal processing technique of the present invention results in sensor error which is produced only by changes in the relative responsivities of pixels in the array of photodetectors. Since these changes are relatively small in silicon detectors, the resulting sensor errors are also correspondingly small in nature.

In a further aspect of the present invention, a sun sensor device particularly adapted for attitude control of spinning spacecraft where a very wide field of view, approaching 180°, is desired, includes two slits or pinhole apertures. The dual pinhole embodiment simplifies signal processing as compared to a single pinhole system, and also improves the accuracy for sun angles near normal to the array of photodetectors because the minimum distance from each of the two pinholes to the array is increased, thereby reducing the subtense of an array pixel.

BRIEF DESCRIPTION OF THE DRAWINGS

FIGS. 3A–3B illustrate a sun elevation angle sensor for a spinning spacecraft in accordance with the dual pinhole embodiment of the present invention; and FIGS. 4A–4C illustrate the sensor-subsystem measuring the phase of the sun in the spin plane of a spinning spacecraft used in conjunction with the sun elevation angle subsystem shown in FIG. 3, and also illustrates two single element silicon detectors with slit apertures which perform the phase measurement function in accordance with the dual pinhole embodiment of the present invention.

DESCRIPTION OF THE BEST MODES FOR CARRYING OUT THE INVENTION

The sun sensor 2 described herein and illustrated by FIGS. 1–4 of the drawings provides a very large angular operating range along the order of substantially ±85° while achieving a very precise angular readout of the sun's angular position within that range.

Figure 2A:
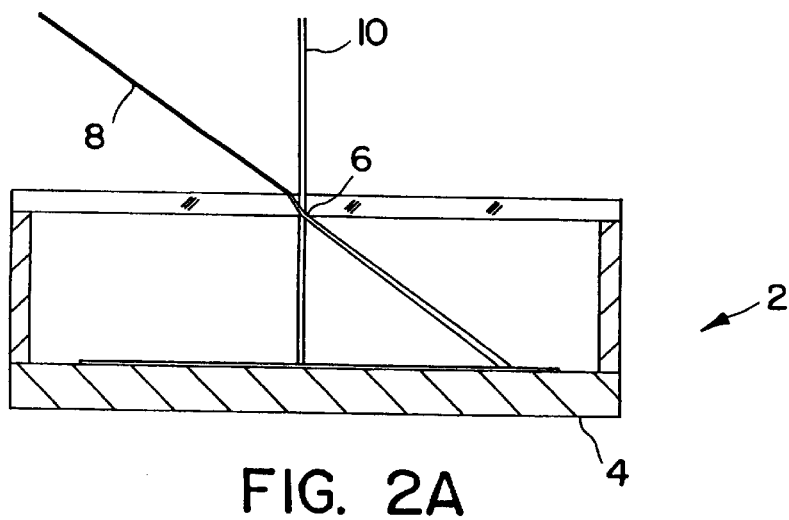
FIGS. 2A–2E illustrate the theory of operation of a single axis digital sun sensor in which sun rays are shown passing through a slit aperture and directed onto an array of photodetectors, and further illustrates signal processing in accordance with the present invention.

This result is achieved using a linear silicon array 4 mounted behind a slit aperture 6, combined with a unique signal processing concept. As illustrated in FIG. 2A, sun rays 8 passing through the sensor's slit aperture are a collimated bundle with a 0.5° angular divergence, which is produced by the 0.5° angular subtense of the sun. Ray 8 is oriented at an angle of 54° from an optical axis 10. If the sun were a point source (such as a star) the collimated bundle would have a divergence angle equal to the diffraction limit defined by the width of the entrance slit and the optical wavelength region of the sensor. Since there are no converging optics imaging the sun on the array, the number of array pixels illuminated by the sun are a function of the pixel dimensions and the slit width, as shown in FIG. 2A. In the preferred embodiment of the invention, the slit aperture 6 is 0.004 inches.

For the dimensions shown in FIG. 2A, 100 pixels are illuminated fully by the sun, when it is normal to the array and the slit (i.e., on the optical axis 10 of the sun sensor). The solar irradiance on pixels beyond these 100 pixels decreases to near zero, with a function defined by the convolution of the circular sun with the edge of the slit aperture. The signal generated by electronically sampling the array is then proportional to this solar irradiance, and produces a pulse train having an envelope defined by the irradiance pattern shown in FIGS. 2B and 2C.

Figure 1A:
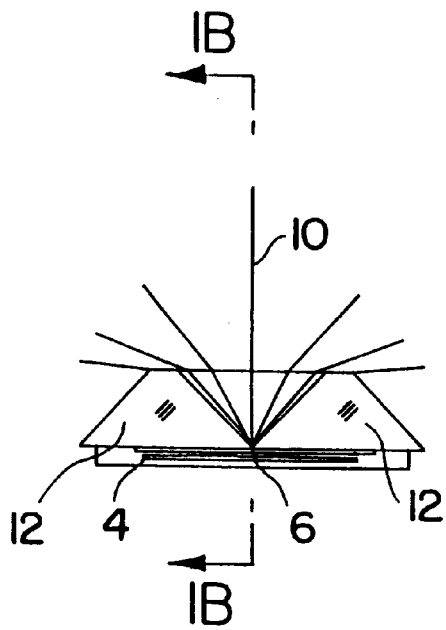
FIGS. 1A–1C illustrate a sun ray passing through a thickened window defining a slit aperture for directing the ray onto an array of photodetectors for use with a non-spinning spacecraft.
Figure 1B:
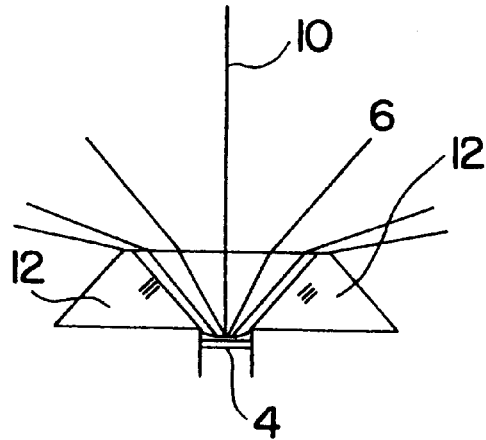
Figure 1C:
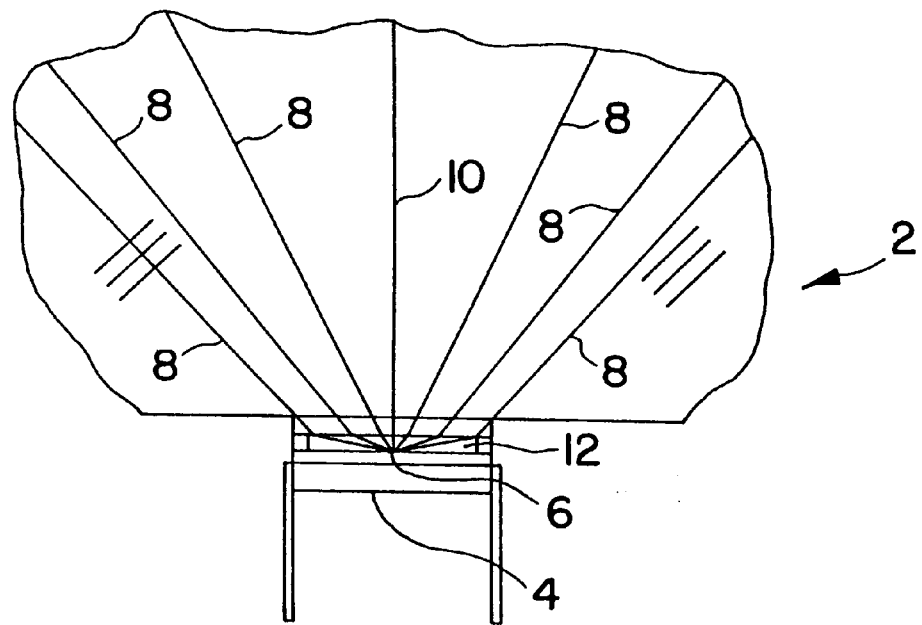

A significant advantage of using the thick (0.4") window 12 shown in FIGS. 1A–1C for the slit assembly, is that this window provides the shielding desirable for sensor applications in a high ionizing radiation environment, such as the upper Van Allen Radiation Belts, combined with artifical sources of such radiation. The window 12 is formed from fused silica, and the sides and bottom surfaces are roughened and blackened except for the area defining the slit 6.

In accordance with the preferred embodiment of the present invention, the optimum slit to array distance is determined by ½ array length divided by the tangent θ, where θ represents the maximum desired angular field of view. Therefore, in accordance with the present invention, the slit to array distance for an increased angular field of view or angular range of ±85° will be equal to ½ the array length divided by the tangent of 85°.

As also noted above, the optimum slit to array distance of the sun sensor can be provided in conjunction with the use of a thicker window having a thickness in the range of between 0.1 inches–0.4 inches, and optimally substantially 0.4 inches in thickness.

Figure 2B:
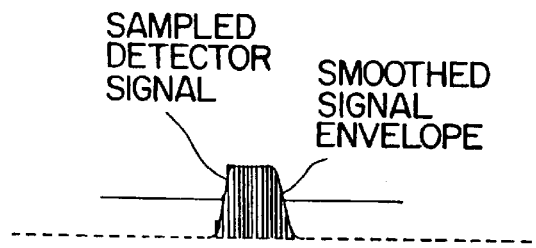
Figure 2C:
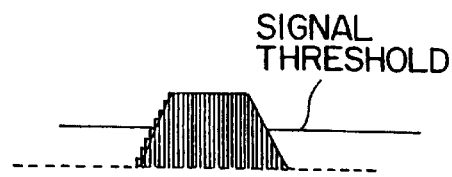
Figure 2D:
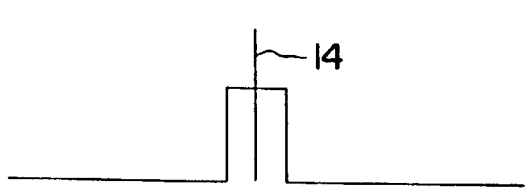
Figure 2E:
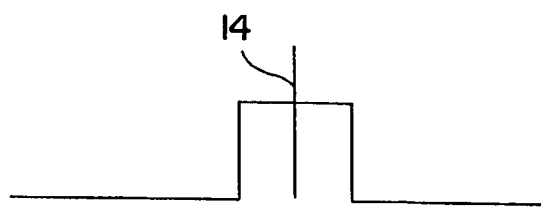

Electronic processing in accordance with the improvement of the present invention demodulates the pulse train envelope, passes it through a low pass filter to eliminate the pulse train "carrier", and applies a threshold to the resulting smoothed envelope, as is shown in FIGS. 2B–2C. The phase of the resultant thresholded squared pulse, which is defined as the bisector of the two edges, represents the angular position 14 of the sun along the array (as shown in FIGS. 2D and 2E), and constitutes the sensor output.

Since the sun signal is extremely strong, and because the sensitivity of the silicon detector array is very high, a signal to noise ratio greater than 1000:1 is easily achieved with these sensors. Therefore, system noise represents a negligibly small component of the sensor output error. The primary component of sensor error is the responsivity variance of array pixels vs. age and/or environment, which tend to disturb the uniformity of the demodulated envelope edges.

The advantage of the signal processing technique described above, is that by using multiple pixels to define the edges of the envelope, individual variations in responsivity are smoothed by the low pass filter, and the effect thereof on the phase of the demodulated pulse (the sensor output) is minimized as a function of the square root of the number of pixels in the pulse edges.

Therefore, in a sun sensor in accordance with the present invention, the sensor output accuracy is limited only by the angular subtense of the pixels in the array and the responsivity uniformity of the pixels in the array vs. time and/or environment. (It should be noted that the absolute non-uniformity of pixel responsivity is of no concern, since these non uniformities can be calibrated out at the time of final sensor test and calibration). The sensor error is produced only by changes in the relative responsivities of pixels in the array. These relative changes are very small in silicon detectors, because all elements in the array see the same environment, and generally age in the same way.

A further advantage of the described configuration is that it allows very wide fields of view, approaching ±90°, about the normal to the sensor window, not heretofore available in the conventional sun sensor devices, while maintaining very high readout accuracy. This is achieved because no focusing optics are required. For large off-axis angles, the movement of the sun's irradiance spot on the array is proportional to the tangent of the off axis angle. The differential of the tangent angle (θ) function is $\sec^2$ angle (θ). For large values of θ, the secant function becomes large and the $\sec^2$ function becomes larger exponentially with increasing angles. The angular error in sun angle readout is proportional to $1/\sec^2$ of the off-axis angle, thereby decreasing as the angle increases.

Although the raw off-axis signal generated by this system is proportional to the tangent function, the built-in gate array processor linearizes this function to achieve the desired linear output, or the spacecraft computer can perform this linearization function.

Referring now to FIGS. 3–4 of the drawing, an optical configuration for an SSAS sun sensor for a spinning spacecraft is discussed. The SSAS Sun Sensor System is composed of two subsystems: 1). A sun elevation angle sensor; and 2). A sun azimuth phase detector.

The configuration of the SSAS sun elevation angle sensor is shown in FIGS. 3A and 3B. As can be seen in this Figure, in order to cover the specified 170° angular coverage (represented by reference numeral 20) in the plane of the spin axis, two 0.1 mm. diameter pinholes 18 are incorporated in two 1.0 mm thick glass substrates 16. A 0.4 micron short-wavelength-pass optical filter and neutral density filter is also incorporated to both minimize the diffraction limited angle, and adjust the signal level of the silicon detector to approximately 80% of saturation. An autocollimation mirror is designated by reference numeral 22, and a linear silicon array is designated by reference numeral 24. The tilted planes of the two pinholes greatly reduce the dynamic range of the sun's radiant power vs. sun elevation angle reaching the detector array, thereby simplifying the signal processing relative to that required for a single pinhole system. The accuracy of the dual pinhole embodiment of the sun sensor for sun angles near normal to the array is also significantly improved because the minimum distance from each of the two pinholes to the array is increased to 4.4 mm., thus reducing the subtense of an array pixel to less than 0.33°. FIG. 3B is a side elevational view of a sun sensor illustrated by FIG. 3A, further illustrating a sun phase measurement channel.

The linear array 24 preferably used in the above described system for elevation angle measurement is the Reticon RL-2048S, which has a 100:1 aspect ratio and pixel dimensions of 25 um×2.5 mm. This results in a field of view width for normal solar incidence of 33.9°, which in turn, allows at least four scans of the sun at a maximum spin rate of 190 rpm with a typical sampling rate of 625 KHz. This large field of view width, when combined with this sampling, does not allow an accurate sun phase (azimuth) measurement within the 360° rotation of the spacecraft spin with this array as a result of the sampling rate. Therefore, a second, simple sensor is required to provide this phase measurement, which is part of the sensor system for spinning spacecraft and will be described as follows.

The only degree of complexity resulting from the two-pinhole approach is the existence of two ambiguities that must be eliminated. The first ambiguity results from the two sun images for sun angles near normal to the array. However, this first ambiguity can readily be eliminated by signal processing software, using the known condition where the sun image from either pinhole which is closer to the center of the array is always the image that is used for elevation angle readout.

The second ambiguity occurs because a single near normal sun image from one pinhole can occupy the same pixels as a sun image far from the normal for the other pinhole. This second ambiguity is eliminated through the use of the single two element phase measured sensor described as follows.

In order to achieve an accurate phase measurement of the sun, two single element silicon detectors 24 with slit apertures in two glass cerium lenses 30, as shown in FIGS. 4A–4C, are employed to cover the 170° field in two 85° sectors, and are used without sampling. A slit 32 on the entrance surface of each lens 30 is preferably 0.4 mm, and a slit 34 on the exit surface of each lens 30 is preferably 0.1 mm. One processing channel is provided for each of the two detectors, and these are operated continuously. These channels provide two functions:

1. They establish the phase angle without the limitations imposed by the sampling rate of the elevation array because their outputs are monitored continuously; and
2. They solve the second elevation ambiguity described above that occurs in the elevation angle sensor shown in FIG. 3 for sun elevation angles near the normal to the sensor, (where only one sun image is seen). This second ambiguity is absolutely resolved by having the software note which of the single element silicon phase detectors sees the sun.

In accordance with the preferred embodiments of the dual pinhole sun sensor as illustrated in FIGS. 3–4, the optimum slit to array distance for enhancing the angular range or field of view of the sun sensor will be equal to the array length divided by θ, where θ is the optimized field of view. Therefore, for example, to increase the field of view of the embodiments of the sun sensor illustrated by FIGS. 3–4 for a maximum range of ±85°, the pinhole to array distance will be equal to the array length divided by tangent 85°.

As noted above, the embodiment of the sun sensor illustrated by FIGS. 3–4 include means for tilting the planes of the two surfaces defining each of the two pinholes. The optimum angular tilt of the respective planes defining the pinholes of the preferred embodiment of the sun sensor according to FIGS. 3–4 will be equal to substantially the enhanced angular field of view or range provided by the sun sensor. For example, if the increased angular field of view or range provided by the sun sensor is ±85°, the optimum angular tilt of the two planes defining the pinholes will be substantially 85°. The angular tilt of the planes defining the pinholes is measured relative to the array. Preferably, the planes defining the pinholes are glass substrates.

Other modifications and advantages of the present invention will become apparent to those skilled in the art. Accordingly, the above description of the preferred embodiments of the invention is intended to be illustrative and not restrictive of the scope of the invention, that scope being defined by the following claims and all equivalents thereto.

We claim:

1. A sun sensor for orbiting spacecraft, said sun sensor comprising:

an array of photodetectors, an element defining an opening therein for directing irradiance of the sun onto said array of photodetectors, and means for processing signals including means for generating a signal proportional to said irradiance by sampling said array and producing a pulse train having an envelope, means for demodulating said pulse train envelope, means for passing said demodulated pulse train through a low pass filter, and means for applying a threshold signal to said pulse train after it passes through said low pass filter.

2. The sun sensor as claimed in claim 1 wherein the output of said sensor representing the angular position of the sun along said array corresponds to the phase of the thresholded square pulse resulting from the application of said threshold signal to said pulse train envelope after it has passed through said low pass filter.

3. The sun sensor as claimed in claim 2 wherein said opening defined in said element is a slit, and said slit is sufficiently wide for directing the irradiance of the sun on said array of photodetectors such that the sun subtends several Least Significant Bit (LSB) optical elements.

4. The sun sensor as claimed in claim 3 wherein said slit is wider than the Least Significant Bit (LSB).

* * * * *